(12) United States Patent
Tomizawa et al.

(10) Patent No.: US 12,113,176 B2
(45) Date of Patent: Oct. 8, 2024

(54) ALL-SOLID BATTERY AND MANUFACTURING METHOD OF THE SAME

(71) Applicant: TAIYO YUDEN CO., LTD., Tokyo (JP)

(72) Inventors: Sachie Tomizawa, Tokyo (JP); Daigo Ito, Tokyo (JP); Chie Kawamura, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 451 days.

(21) Appl. No.: 16/991,963

(22) Filed: Aug. 12, 2020

(65) Prior Publication Data

US 2021/0057781 A1    Feb. 25, 2021

(30) Foreign Application Priority Data

Aug. 22, 2019  (JP) ................. 2019-152211

(51) Int. Cl.
*H01M 10/0562* (2010.01)
*H01M 4/62* (2006.01)
(Continued)

(52) U.S. Cl.
CPC ....... *H01M 10/0585* (2013.01); *H01M 4/625* (2013.01); *H01M 10/0562* (2013.01);
(Continued)

(58) Field of Classification Search
CPC ......... H01M 10/0562; H01M 10/0585; H01M 2004/021; H01M 2300/0071
See application file for complete search history.

(56) References Cited

U.S. PATENT DOCUMENTS

| | | | |
|---|---|---|---|
| 6,428,929 B1* | 8/2002 | Koy ............. | H01M 4/133 429/231.1 |
| 2008/0081257 A1* | 4/2008 | Yoshida ............ | H01M 10/0562 429/209 |

(Continued)

FOREIGN PATENT DOCUMENTS

| | | |
|---|---|---|
| CN | 102473960 A | 5/2012 |
| CN | 109755631 A | 5/2019 |

(Continued)

OTHER PUBLICATIONS

Notice of Reasons for Refusal dated Mar. 14, 2023, issued by the Japanese Patent Office in corresponding application JP 2019-152211.

(Continued)

*Primary Examiner* — Osei K Amponsah
(74) *Attorney, Agent, or Firm* — Stein IP LLC (57) ABSTRACT

An all-solid battery includes: a solid electrolyte layer mainly composed of oxide-based solid electrolyte; a first electrode layer formed on a first principal face of the solid electrolyte layer, the first electrode layer containing an active material; a second electrode layer formed on a second principal face of the solid electrolyte layer, the second electrode layer containing another active material, wherein no collector layer that is in contact with the second electrode layer is provided in a direction in which the solid electrolyte layer, the first electrode layer, and the second electrode layer are stacked, and the second electrode layer includes board-shaped carbon.

10 Claims, 8 Drawing Sheets

(51) Int. Cl.
*H01M 10/0585* (2010.01)
*H01M 4/02* (2006.01)
(52) U.S. Cl.
CPC .............. *H01M 2004/021* (2013.01); *H01M 2300/0071* (2013.01)

(56) References Cited

U.S. PATENT DOCUMENTS

| | | | | |
|---|---|---|---|---|
| 2012/0115039 | A1 | 5/2012 | Ouchi et al. | 429/304 |
| 2012/0276439 | A1 | 11/2012 | Fujita et al. | 429/149 |
| 2016/0372799 | A1* | 12/2016 | Watanabe | H01M 50/48 |
| 2019/0131616 | A1 | 5/2019 | Tomizawa et al. | H01M 4/133 |
| 2019/0312257 | A1* | 10/2019 | Ishiwatari | H01M 4/62 |

FOREIGN PATENT DOCUMENTS

| | | | |
|---|---|---|---|
| JP | 2011-129474 | A | 6/2011 |
| JP | 2013-038948 | A | 2/2013 |
| JP | 2016-192370 | A | 11/2016 |
| JP | 2019-087346 | A | 6/2019 |

OTHER PUBLICATIONS

First Office Action was issued on Dec. 19, 2023 in a counterpart Chinese Patent Application No. 202010842864.3.

* cited by examiner

ALL-SOLID BATTERY AND MANUFACTURING METHOD OF THE SAME

CROSS-REFERENCE TO RELATED APPLICATION

This application is based upon and claims the benefit of priority of the prior Japanese Patent Application No. 2019-152211, filed on Aug. 22, 2019, the entire contents of which are incorporated herein by reference.

FIELD

A certain aspect of the present embodiments relates to an all-solid battery and a manufacturing method of the same.

BACKGROUND

Secondary batteries have been used in various fields. Secondary batteries having an electrolytic solution have a problem such as leak of the electrolytic solution. Thus, all-solid batteries having a solid electrolyte and other solid elements are being developed as disclosed in, for example, Japanese Patent Application Publication Nos. 2013-38948 and 2019-87346 (hereinafter, referred to as Patent Documents 1 and 2).

SUMMARY

To sufficiently ensure the conductivity and reduce cost, carbon may be used as a conductive auxiliary agent in the electrode layer. However, when carbon is added to the electrode layer, carbon and the solid electrolyte in the electrode layer interact with each other during collective firing, and thereby, the ionic conductivity of the electrode layer may decrease. Additionally, when carbon is excessively dispersed in the electrode layer, a conductive network formed by the conductive auxiliary agent is reduced, and thereby, the electron conductivity may decrease. In the manufacturing process of an all-solid battery including a collector, it is necessary to form three layers: an electrode layer, a collector layer, and an electrode layer by application. Therefore, the process is complicating.

According to a first aspect of the present embodiments, there is provided an all-solid battery including: a solid electrolyte layer mainly composed of oxide-based solid electrolyte; a first electrode layer formed on a first principal face of the solid electrolyte layer, the first electrode layer containing an active material; a second electrode layer formed on a second principal face of the solid electrolyte layer, the second electrode layer containing another active material, wherein no collector layer that is in contact with the second electrode layer is provided in a direction in which the solid electrolyte layer, the first electrode layer, and the second electrode layer are stacked, and the second electrode layer includes board-shaped carbon.

According to a second aspect of the present embodiments, there is provided a manufacturing method of an all-solid battery including: preparing a multilayer structure including: a green sheet containing oxide-based solid electrolyte powder, a layer formed on a first principal face of the green sheet by applying paste for a first electrode layer to the first principal face of the green sheet, and a layer formed on a second principal face of the green sheet by applying paste for a second electrode layer to the second principal face of the green sheet, no paste mainly composed of a metal being applied to at least the paste for the second electrode layer; and firing the multilayer structure, wherein the paste for the second electrode layer includes board-shaped carbon.

DETAILED DESCRIPTION

Hereinafter, embodiments will be described with reference to the accompanying drawings.

EMBODIMENT

Figure 1:
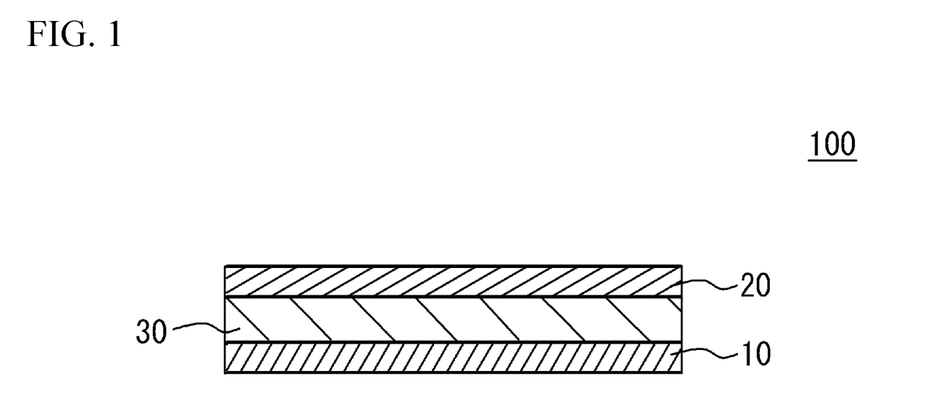
FIG. 1 is a schematic cross-sectional view of a fundamental structure of an all-solid battery.

FIG. 1 is a schematic cross-sectional view of a fundamental structure of an all-solid battery 100. As illustrated in FIG. 1, the all-solid battery 100 has a structure in which an oxide-based solid electrolyte layer 30 is sandwiched between a first electrode layer 10 and a second electrode layer 20. The first electrode layer 10 is formed on a first principal face of the solid electrolyte layer 30. The second electrode layer 20 is formed on a second principal face of the solid electrolyte layer 30.

When the all-solid battery 100 is used as a secondary battery, one of the first electrode 10 and the second electrode 20 is used as a positive electrode, and the other is used as a negative electrode. In the present embodiment, as an example, the first electrode 10 is used as a positive electrode and the second electrode 20 is used as a negative electrode.

At least, the solid electrolyte layer 30 is a phosphoric acid salt-based solid electrolyte. The phosphoric acid salt-based solid electrolyte has, for example, a NASICON structure. The phosphoric acid salt-based solid electrolyte having a NASICON structure has high conductivity and is stable in normal atmosphere. The phosphoric acid salt-based solid electrolyte is, for example, such as a salt of phosphoric acid including lithium. Examples of the salt of phosphoric acid include, but are not limited to, a composite salt of phosphoric acid with Ti (for example, $LiTi_2(PO_4)_3$). Alternatively, at least a part of Ti may be replaced with a quadrivalent transition metal such as, but not limited to, Ge, Sn, Hf, or Zr. To increase a content of Li, a part of Ti may be replaced with a trivalent transition metal such as, but not limited to, Al, Ga, In, Y or La. More specifically, examples of the phosphoric acid salt including lithium and having a NASICON structure include $Li_{1+x}Al_xGe_{2-x}(PO_4)_3$, $Li_{1+x}Al_xZr_{2-x}(PO_4)_3$, and $Li_{1+x}Al_xTi_{2-x}(PO_4)_3$. For example, it is preferable to use a Li—Al—Ge—$PO_4$-based material to which a transition metal contained in the phosphoric acid salt having the olivine type crystal structure contained in at least one of the first electrode layer 10 and the second electrode layer 20 is added in advance. For example, when the first electrode layer 10 and the second electrode layer 20 contain a phosphoric acid salt containing Co and Li, it is preferable that the solid electrolyte layer 30 contains a Li—Al—Ge—PO$_4$-based material to which Co is added in advance. In this case, it is possible to inhibit the transition metal contained in the electrode active material from solving into the electrolyte. When the first electrode layer 10 and the second electrode layer 20 contain a phosphoric acid salt containing Li and a transition element other than Co, it is preferable that the solid electrolyte layer 30 contains a Li—Al—Ge—PO$_4$-based material to which the transition element is added in advance.

At least, the first electrode layer 10 used as a positive electrode contains, as an electrode active material, a material having an olivine type crystal structure. It is preferable that the second electrode layer 20 also contains the electrode active material. Examples of the electrode active material include, but are not limited to, a phosphoric acid salt containing a transition metal and lithium. The olivine type crystal structure is a crystal of natural olivine. It is possible to identify the olivine type crystal structure, by using X-ray diffraction.

LiCoPO$_4$ containing Co may be used as a typical example of the electrode active material having the olivine type crystal structure. Other phosphoric acid salts, in which Co acting as a transition metal is replaced with another transition metal in the above-mentioned chemical formula, may be used. A ratio of Li and PO$_4$ may fluctuate in accordance with a valence. It is preferable to use Co, Mn, Fe, Ni, or the like as the transition metal.

The electrode active material having the olivine type crystal structure acts as a positive electrode active material in the first electrode layer 10 acting as a positive electrode. For example, when only the first electrode layer 10 contains the electrode active material having the olivine type crystal structure, the electrode active material acts as the positive electrode active material. When the second electrode layer 20 also contains an electrode active material having the olivine type crystal structure, a discharge capacity may increase and an operation voltage may increase because of electric discharge, in the second electrode layer 20 acting as a negative electrode. The function mechanism is not completely clear. However, the mechanism may be caused by partial solid-phase formation together with the negative electrode active material.

When both the first electrode layer 10 and the second electrode layer 20 contain an electrode active material having the olivine type crystal structure, the electrode active material of each of the first electrode layer 10 and the second electrode layer 20 may have a common transition metal. Alternatively, the transition metal of the electrode active material of the first electrode layer 10 may be different from that of the second electrode layer 20. The first electrode layer 10 and the second electrode layer 20 may have only a single type of transition metal. The first electrode layer 10 and the second electrode layer 20 may have two or more types of transition metal. It is preferable that the first electrode layer 10 and the second electrode layer 20 have a common transition metal. It is more preferable that the electrode active materials of the both electrode layers have the same chemical composition. When the first electrode layer 10 and the second electrode layer 20 have a common transition metal or a common electrode active material of the same composition, similarity between the compositions of the both electrode layers increases. Therefore, even when terminals of the all-solid battery 100 are connected in a positive/negative reversed state, the all-solid battery 100 can be actually used without malfunction, in accordance with the usage purpose.

The second electrode layer 20 may contain a known material as the negative electrode active material. When only one of the electrode layers contains the negative electrode active material, it is clarified that the one of the electrode layers acts as a negative electrode and the other acts as a positive electrode. When only one of the electrode layers contains the negative electrode active material, it is preferable that the one of the electrode layers is the second electrode layer 20. Both of the electrode layers may contain the known material as the negative electrode active material. Conventional technology of secondary batteries may be applied to the negative electrode active material. Examples of the negative electrode active material include, but are not limited to, titanium oxide, lithium-titanium composite oxide, lithium-titanium composite salt of phosphoric acid, carbon, and vanadium lithium phosphate.

In the forming process of the first electrode layer 10 and the second electrode layer 20, moreover, an oxide-based solid electrolyte material or a conductive material (conductive auxiliary agent) is added. When the material is evenly dispersed into water or organic solution together with binder or plasticizer, paste for electrode layer is obtained. In the present embodiment, a carbon material may be contained as the conductive auxiliary agent. Metal may be further contained as the conductive auxiliary agent. Pd, Ni, Cu, or Fe, or an alloy thereof may be used as a metal of the conductive auxiliary agent.

Figure 2:
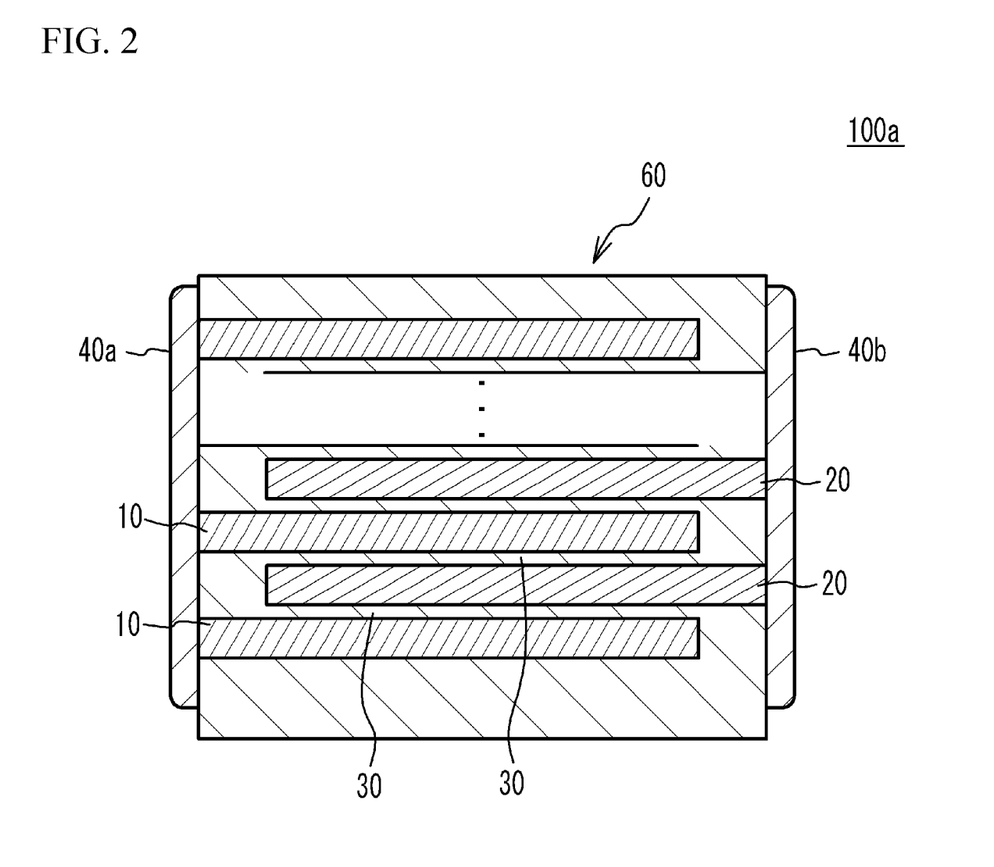
FIG. 2 is a schematic cross-sectional view of an all-solid battery in which a plurality of cell units is stacked.

FIG. 2 is a schematic cross-sectional view of an all-solid battery 100a in which a plurality of cell units is stacked. The all-solid battery 100a includes a multilayer chip 60 having a substantially rectangular parallelepiped shape, a first external electrode 40a disposed on a first edge face of the multilayer chip 60, and a second external electrode 40b disposed on a second edge face facing the first edge face.

Among the four faces other than the two edge faces of the multilayer chip 60, two faces other than the upper face and the lower face in the stacking direction are referred to as side faces. The first external electrode 40a and the second external electrode 40b extend on the upper face and the lower face in the stacking direction and two side faces of the multilayer chip 60. The first external electrode 40a and the second external electrode 40b are separated from each other.

In the following descriptions, the same reference numeral is provided to each member of the all-solid batteries having the same composition range, the same average thickness range, and the same particle size distribution range as those of the all-solid battery 100, and the description thereof is thus omitted.

In the all-solid battery 100a, a plurality of the first electrode layers 10 and a plurality of the second electrode layers 20 are alternately stacked while the solid electrolyte layers 30 are interposed between the first electrode layers 10 and the second electrode layers 20. In the stacking structure including the first electrode layers 10, the solid electrolyte layers 30, and the second electrode layers 20, no collector mainly composed of a metal exists. Edges of the first electrode layers 10 are exposed to the first edge face of the multilayer chip 60 but are not exposed to the second edge face. Edges of the second electrode layers 20 are exposed to the second edge face of the multilayer chip 60 but are not exposed to the first edge face. Thus, the first electrode layers 10 and the second electrode layers 20 are alternately electrically connected to the first external electrode 40a and the second external electrode 40b. The solid electrolyte layers 30 extend from the first external electrode 40a to the second external electrode 40b. As described above, in the all-solid battery 100a, stack units each including the first electrode layer 10, the solid electrolyte layer 30, and the second electrode layer 20 and stack units each including the second electrode layer 20, the solid electrolyte layer 30, and the first electrode layer 10 are alternately repeated. Thus, the all-solid battery 100a has a structure in which a plurality of cell units is stacked in fully parallel.

As described above, in the present embodiment, a carbon material is used as conductive auxiliary agents for the first electrode layer 10 and the second electrode layer 20. The carbon material is not sherardized and does not grow in grain size in the firing process. Thus, high conductivity is ensured with less volume fraction. Because of this, the carbon material does not inhibit filling of the active material in the electrode layer. In addition, the carbon material is inexpensive.

Thus, it may be considered to add a carbon material such as fine-grained carbon or fiber-shaped carbon to the first electrode layer 10 and the second electrode layer 20. However, when a carbon material including micropores or a carbon material having a high specific surface area is added to the first electrode layer 10 and the second electrode layer 20, the carbon material interacts with the solid electrolyte in the first electrode layer 10 and the solid electrolyte in the second electrode layer 20 during collective firing, and thereby, the ionic conductivity of the first electrode layer 10 and the second electrode layer 20 may decrease. The interaction here is the composition deviation of the solid electrolyte due to the penetration of the liquid phase into the carbon micropores in the firing process of the sintered type all-solid battery associated with liquid phase sintering. In addition, when the carbon material is excessively dispersed in the first electrode layer 10 and the second electrode layer 20, the conductive network formed by the conductive auxiliary agent may be reduced, and thereby, electron conductivity may decrease.

Figure 3:
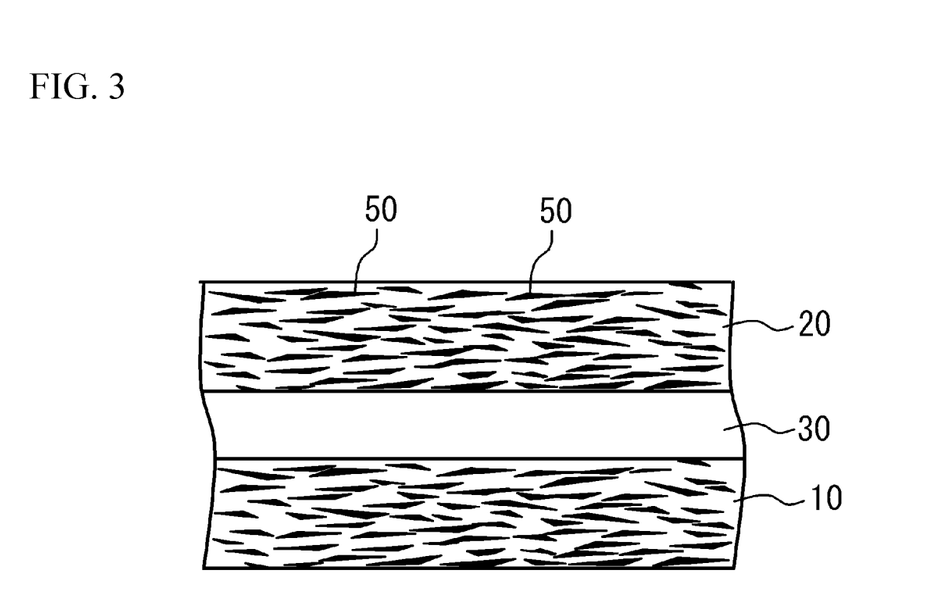
FIG. 3 illustrates a board-shaped carbon.

In the present embodiment, as illustrated in FIG. 3, board-shaped carbon 50 is added as the conductive auxiliary agent to the first electrode layer 10 and the second electrode layer 20. The board-shaped carbon 50 does not have many micropores unlike fine-grained carbon. Thus, the interaction between the carbon material and the solid electrolyte in the first electrode layer 10 and between the carbon material and the solid electrolyte in the second electrode layer 20 is inhibited. Thus, the first electrode layer 10 and the second electrode layer 20 can maintain their high ionic conductivity. In addition, addition of the board-shaped carbon 50 prevents the reduction of the conductive network (the structure deterioration), which occurs when fine-grained carbon is excessively dispersed, in the first electrode layer 10 and the second electrode layer 20 because of the characteristic structure of the board-shaped carbon 50, and allows the conductive network to be efficiently formed. Thus, high electron conductivity in the first electrode layer 10 and the second electrode layer 20 is maintained. The board-shaped carbon is board-like crystalline graphite, and can be defined as carbon having an average thickness of 3 μm or less and a diameter in the longitudinal direction equal to or greater than three times the average thickness.

Since the first electrode layer 10 and the second electrode layer 20 have high electron conductivity, it is unnecessary to provide a collector layer mainly composed of a metal. The collector layer is a layer that is stacked together with the first electrode layer 10, the solid electrolyte layer 30, and the second electrode layer, is in contact with the first electrode layer 10 or the second electrode layer 20, and is mainly composed of a metal. In particular, when the collecting distance is 50 mm or less, sufficient collecting characteristics are obtained without providing the collector layer. When it is unnecessary to provide the collector, the manufacturing process of the all-solid battery 100 and the all-solid battery 100a is simplified. Thus, the all-solid battery 100 and the all-solid battery 100a can be manufactured with a simple process. In addition, since the process is simplified, the productivity is improved, and the cost is reduced.

In addition, since the board-shaped carbon 50 has a diameter in the longitudinal direction of several micrometers, there is no concern that the conductive network path is reduced during mixing of composite materials for the electrode. Therefore, the electron conductivity in the electrode layer of the all-solid battery is effectively exerted. The board-shaped carbon 50 has a structural characteristic that it has a board shape. Thus, when the first electrode layer 10 and the second electrode layer 20 are formed by application, the board-shaped carbon 50 is oriented in nearly parallel to the first electrode layer 10 and the second electrode layer 20. The board-shaped carbon 50 oriented in the above manner becomes oriented in a slightly oblique direction as ceramic is sintered during firing. Thus, the board-shaped carbon 50 plays a role as a conductive auxiliary agent and also acts as a collector. As a result, a design that eliminates the need to separately provide a collector layer is possible.

In the first electrode layer 10 and the second electrode layer 20, when the additive amount of the board-shaped carbon 50 is excessively small, the first electrode layer 10 and the second electrode layer 20 may have insufficient electron conductivity. Thus, in the first electrode layer 10 and the second electrode layer 20, it is preferable to set a lower limit for the proportion of the board-shaped carbon 50. For example, in the first electrode layer 10 and the second electrode layer 20, the proportion of the board-shaped carbon 50 is preferably 20 vol % or greater. In this case, even when the additive amount of fine-grained carbon to the first electrode layer 10 and the second electrode layer 20 is less than 5 vol %, the first electrode layer 10 and the second electrode layer 20 can have sufficient electron conductivity. Inhibition of sintering is reduced by reducing the additive amount of fine-grained carbon. Thereby, high ionic conductivity is maintained in the first electrode layer 10 and the second electrode layer 20. Likewise, in the first electrode layer 10 and the second electrode layer 20, the proportion of the board-shaped carbon 50 is more preferably 25 vol % or greater, further preferably 30 vol % or greater. The fine-grained carbon can be defined as carbon made of particles having a primary particle size of 0.5 μm or less.

On the other hand, when the additive amount of the board-shaped carbon 50 is excessively large in the first electrode layer 10 and the second electrode layer 20, the filling amount of the active material in the first electrode layer 10 and the second electrode layer 20 decreases, and the capacity may be insufficiently secured. Thus, it is preferable to set an upper limit for the proportion of the board-shaped carbon 50 in the first electrode layer 10 and the second electrode layer 20. For example, in the first electrode layer 10 and the second electrode layer 20, the proportion of the board-shaped carbon 50 is preferably 50 vol % or less, more preferably 45 vol % or less, further preferably 40 vol % or less.

In addition, when the amount of the carbon material other than the board-shaped carbon, such as fine-grained carbon, is large in the first electrode layer 10 and the second electrode layer 20, it may be impossible to maintain high ionic conductivity in the first electrode layer 10 and the second electrode layer 20. Thus, it is preferable to set a lower limit for the proportion of the amount of the board-shaped carbon 50 to the entire amount of carbon in the first electrode layer 10 and the second electrode layer 20. For example, in the first electrode layer 10 and the second electrode layer 20, the proportion of the amount of the board-shaped carbon 50 to the entire amount of carbon is preferably 80 vol % or greater, more preferably 85 vol % or greater, further preferably 90 vol % or greater.

In addition, too short board-shaped carbon 50 may cause the board-shaped carbon 50 not to sufficiently exert the electron conductivity. Thus, it is preferable to set a lower limit for the length of the board-shaped carbon 50. For example, the average particle size (a D90 particle size) in the longitudinal direction of the board-shaped carbon 50 is preferably 2 μm or greater, more preferably 4 μm or greater, further preferably 6 μm or greater.

On the other hand, too long board-shaped carbon 50 may cause problems such as reduction in the ion conduction path or decrease in mechanical strength in the first electrode layer 10 and the second electrode layer 20. Thus, it is preferable to set an upper limit for the length of the board-shaped carbon 50. For example, the average particle size (a D90 particle size) in the longitudinal direction of the board-shaped carbon 50 is preferably 30 μm or less, more preferably 25 μm or less, further preferably 20 μm or less.

The additive amount (the volume ratio) of the board-shaped carbon 50 is calculated from the specific gravity and the additive weight of each constitutional material in the first electrode layer 10 and the second electrode layer 20. The volume Vcera is calculated from the specific gravity and the additive amount of the ceramic material. The volume Vc of the board-shaped carbon 50 is calculated from the specific gravity 2.1 g/cm$^3$ and the additive weight of the board-shaped carbon 50. Thereafter, the volume ratio of the volume of the board-shaped carbon 50 to the entire volume of the electrode layer Vc/(Vcera+Vc)×100 is calculated in percent figures. The proportion of the amount of the board-shaped carbon 50 to the entire amount of carbon is calculated from the additive weight and the specific gravity. The D90 value of the board-shaped carbon 50 is obtained as follows. The longer length of the lengths (Ferret diameters) of sides of the circumscribed rectangle of the board-shaped carbon 50 is measured for 300 of the board-shaped carbon 50 in the cross-sectional SEM observation image of the all-solid battery 100. The particle size at which the ratio of the cumulative value obtained by accumulating the measured lengths in ascending order to the cumulative value of all the measured lengths is 90 percent can be defined as the D90 value of the board-shaped carbon 50.

Figure 4:
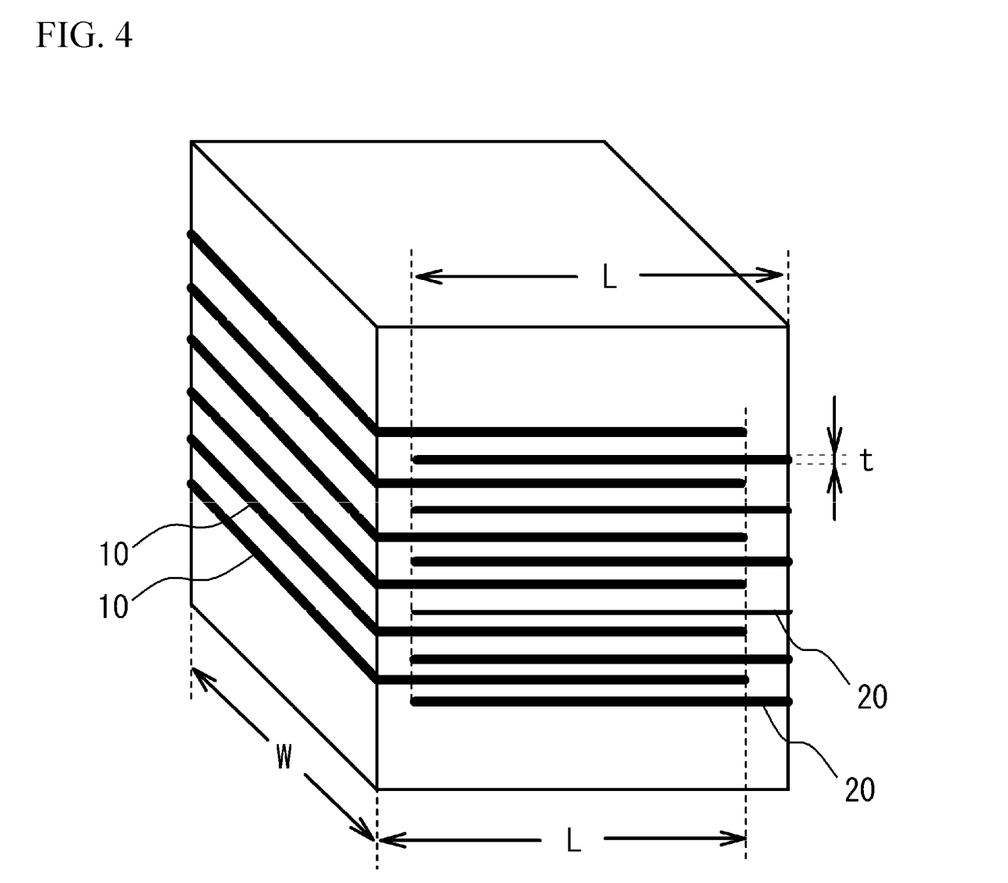
FIG. 4 illustrates a relationship among a collecting distance, an electrode width, and an average thickness.

As illustrated in FIG. 4, when the electrode distance in a depth direction as viewed from the external electrode (the distance between an external electrode and the end farthest from the external electrode of the electrode layer in the direction in which the electrode layer extends) is defined as the collecting distance L, the electrode layer width in the direction perpendicular to the collecting distance L in the plane of each electrode layer is defined as the width W, and the average thickness of each electrode layer is represented by t, smaller L/(W×t) allows the collector effect in the electrode layer to be more sufficiently exerted. For example, L/(W×t) is preferably 2000 or less, more preferably 1500 or less, further preferably 1000 or less.

In the above embodiment, the board-shaped carbon is added to both the first electrode layer 10 and the second electrode layer 20. However, it is sufficient if the board-shaped carbon is added to at least one of the first electrode layer 10 and the second electrode layer 20. In this case, no collector may be provided to the electrode layer to which the board-shaped carbon is added.

Figure 5:
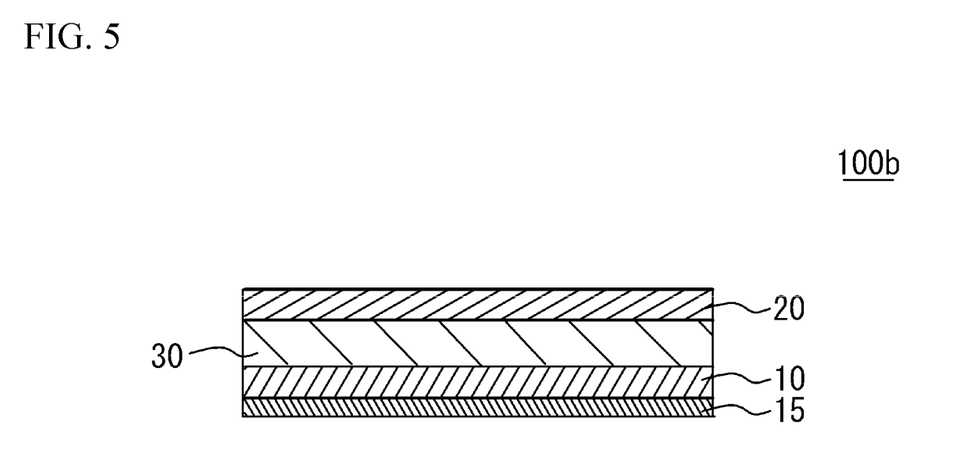
FIG. 5 illustrates another structure of the all-solid battery.

For example, as illustrated in FIG. 5, a collector layer 15 may be disposed on the face opposite from the solid electrolyte layer 30 of the first electrode layer 10, and no collector layer may be disposed on the face opposite from the solid electrolyte layer 30 of the second electrode layer 20. The collector layer 15 is a layer mainly composed of a metal such as Pd. In such a structure, board-shaped carbon may be added to the second electrode layer 20, and no board-shaped carbon may be added to the first electrode layer 10.

Figure 6:
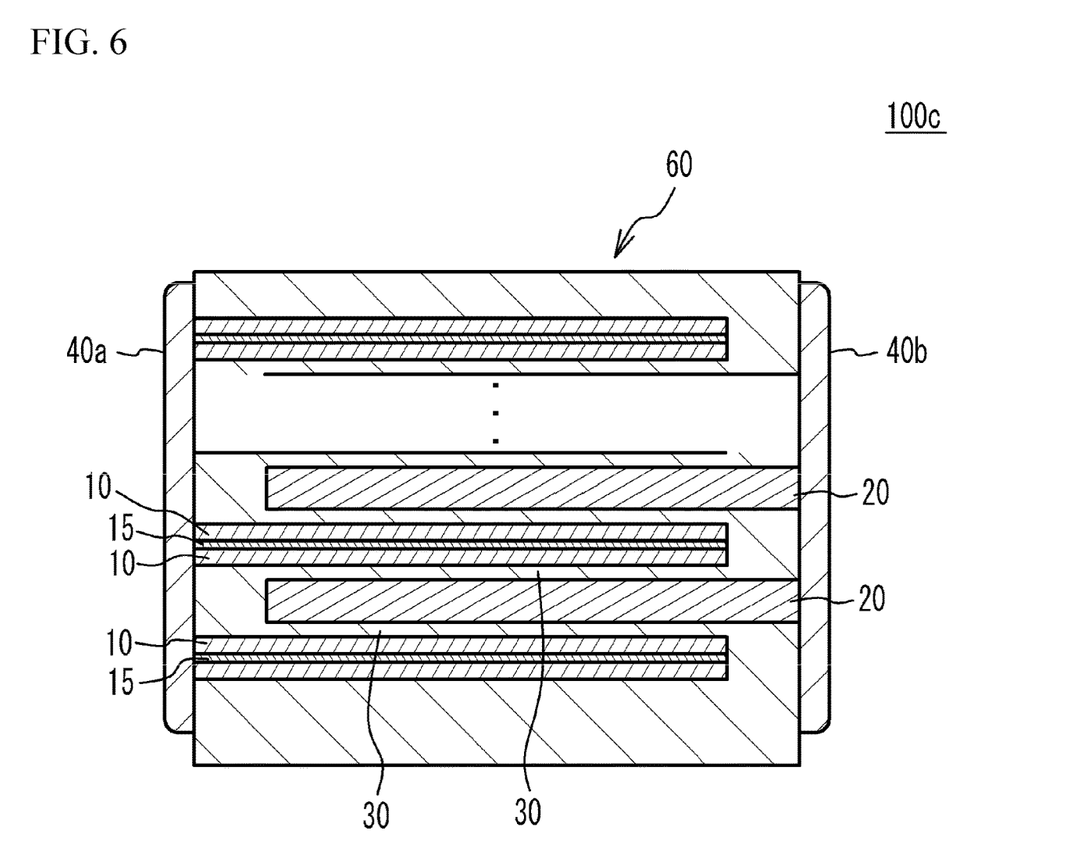
FIG. 6 illustrates yet another structure of the all-solid battery.

Similarly, as illustrated in FIG. 6, the collector layer 15 may be sandwiched between the first electrode layer 10 and the first electrode layer 10. In this case, the collector layer 15 is in contact with the first external electrode 40*a*. In such a structure, board-shaped carbon may be added to the second electrode layer 20, and no board-shaped carbon may be added to the first electrode layer 10.

Figure 7:
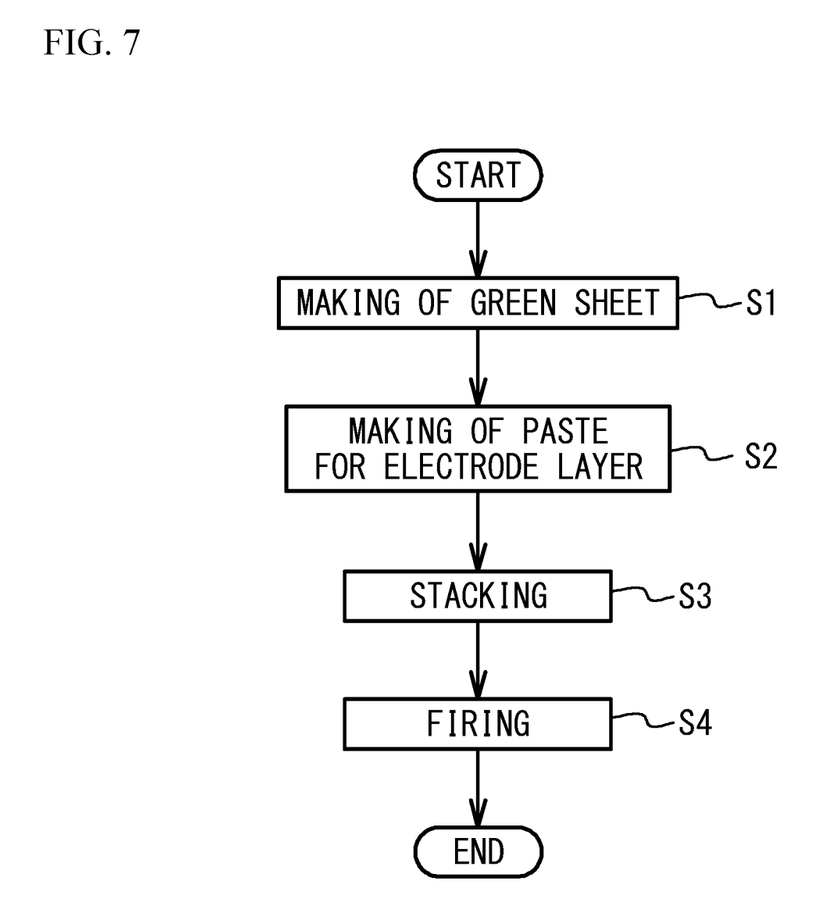
FIG. 7 is a flowchart of a manufacturing method of the all-solid battery.

FIG. 7 is a flowchart of a manufacturing method of the all-solid battery 100*a*. Making Process of Ceramic Raw Powder First, powder of phosphoric acid salt-based solid electrolyte structuring the solid electrolyte layer 30 is made. For example, it is possible to make the powder of the phosphoric acid salt-based solid electrolyte structuring the solid electrolyte layer 30, by mixing raw materials and additives and using a solid phase synthesis method or the like. The resulting powder is subjected to dry grinding to adjust an average grain diameter of the resulting powder to a desired one. For example, the average grain diameter of the resulting powder is adjusted to the desired one with use of a planetary boll mill having ZrO$_2$ balls with a diameter of 5 mm.

The additives include sintering auxiliary agent. Included as the sintering auxiliary agent is, for example, one or more of glass components such as Li—B—O-based compounds, Li—Si—O-based compounds, Li—C—O-based compounds, Li—S—O-based compounds, and Li—P—O-based compounds.

Making Process of Green Sheets

Then, the resulting powder is evenly dispersed into aqueous solvent or organic solvent together with a binding agent, a dispersing agent, a plasticizer and so on. The resulting powder is subjected to wet crushing. Thereby, solid electrolyte slurry having a desired grain diameter is obtained. In this case, a bead mill, a wet jet mill, a kneader, a high-pressure homogenizer or the like may be used. It is preferable to use the bead mill because adjusting of particle size distribution and dispersion are performed at the same time. A binder is added to the resulting solid electrolyte slurry. Thus, solid electrolyte paste is obtained. A green sheet is obtained by applying the solid electrolyte paste. The application method is not limited to a particular method. For example, a slot die method, a reverse coat method, a gravure coat method, a bar coat method, a doctor blade method or the like may be used. It is possible to measure grain diameter distribution after the wet crushing, with use of a laser diffraction measuring device using a laser diffraction scattering method.

Making Process of Paste for Electrode Layer

Next, paste for electrode layer is made in order to make the first electrode layer 10 and the second electrode layer 20. For example, an electrode active material and a solid electrolyte material are highly dispersed by a bead mill or the like to make ceramic paste made of only ceramic particles. In addition, the ceramic paste and board-shaped carbon are mixed well.

Stacking Process

In the case of the all-solid battery 100 described in FIG. 1, the paste for electrode layer is printed on both faces of the green sheet. The method for printing is not particularly limited, and may be a screen-printing method, an intaglio printing method, a relief printing method, or a calender roll method. The screen printing is considered as the most typical method for fabricating the multilayer device having many thin layers stacked. However, use of ink-jet printing may be preferable when exceptionally fine electrode patterns or patterns having a special shape are printed. In the case of an all-solid battery 100b described in FIG. 5, paste for collector is applied on the paste for one of the electrode layers.

Figure 8:
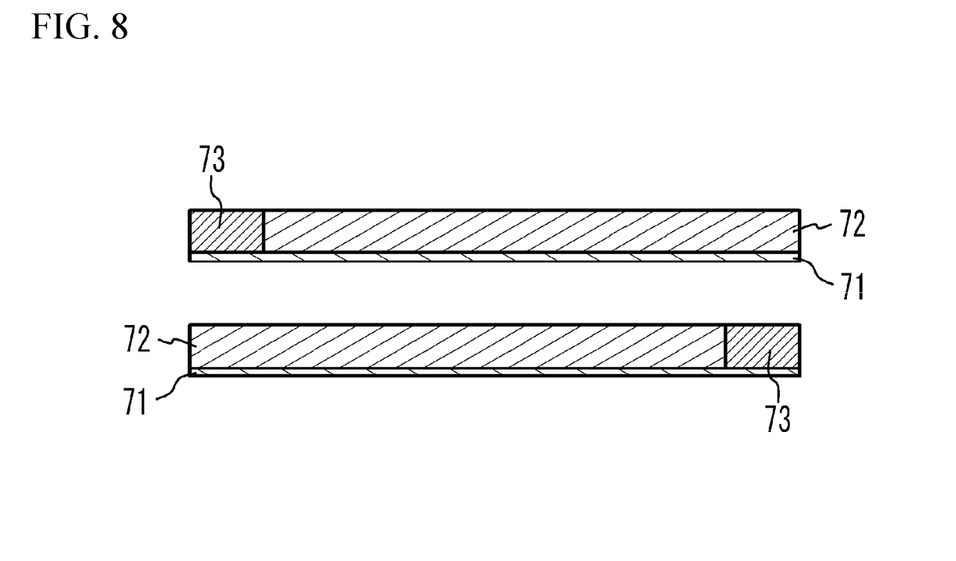
FIG. 8 illustrates a stacking process.

In the case of the all-solid battery 100a described in FIG. 2, as illustrated in FIG. 8, paste 72 for electrode layer is printed on a face of a green sheet 71. A reverse pattern 73 is printed on a part of the green sheet 71 where no paste 72 for electrode layer is printed. The material of the reverse pattern 73 may be the same as that of the green sheet 71. The green sheets 71 after printing are stacked such that the green sheets 71 are alternately shifted from each other to obtain a multilayer structure. In this case, in the multilayer structure, the paste 72 for electrode layer is alternately exposed to the two edge faces of the multilayer structure. In the case of an all-solid battery 100c described in FIG. 6, the paste for collector is disposed in the paste 72 for one of the electrode layers.

Firing Process

Next, the obtained multilayer structure is fired. To inhibit disappearance of the carbon material contained in the paste for electrode layer, it is preferable to set an upper limit for the oxygen partial pressure of the firing atmosphere. More specifically, the oxygen partial pressure of the firing atmosphere is preferably $2 \times 10^{-13}$ atm or less. On the other hand, to inhibit the melting of the phosphoric acid salt-based solid electrolyte, it is preferable to set a lower limit for the oxygen partial pressure of the firing atmosphere. More specifically, the oxygen partial pressure of the firing atmosphere is preferably $5 \times 10^{-22}$ atm or greater. By setting the range of the oxygen partial pressure as described above, the disappearance of the carbon material and the melting of the phosphoric acid salt-based solid electrolyte are inhibited. The method of adjusting the oxygen partial pressure of the firing atmosphere is not limited to a particular method.

Thereafter, metal paste is applied to the two edge faces of the multilayer chip 60 and then fired. This process forms the first external electrode 40a and the second external electrode 40b. Alternatively, the multilayer chip 60 may be set to a dedicated jig that allows the first external electrode 40a and the second external electrode 40b to be separated from each other and exposed on the upper face, the lower face, and two side faces that are in contact with the two edge faces, and then the electrodes may be formed by sputtering. The first external electrode 40a and the second external electrode 40b may be formed by plating the formed electrodes.

The manufacturing method in accordance with the present embodiment inhibits the interaction between the carbon material and the solid electrolyte in the first electrode layer 10 and between the carbon material and the solid electrolyte in the second electrode layer 20 because the board-shaped carbon 50 does not have many micropores unlike fine-grained carbon. Accordingly, the first electrode layer 10 and the second electrode layer 20 can maintain high ionic conductivity. In addition, addition of the board-shaped carbon 50 prevents the reduction of the conductive network (structure deterioration), which occurs when fine-grained carbon is excessively dispersed, in the first electrode layer 10 and the second electrode layer 20 because of the characteristic structure of the board-shaped carbon 50, and allows the conductive network to be efficiently formed. Therefore, high electron conductivity in the first electrode layer 10 and the second electrode layer 20 is maintained.

Since the first electrode layer 10 and the second electrode layer 20 have high electron conductivity, it is unnecessary to provide a collector layer mainly composed of a metal. In particular, when the collecting distance is 50 mm or less, sufficient collecting characteristics are obtained even when no collector layer is provided. When it is unnecessary to provide a collector, the production process is simplified. Thus, the all-solid batteries 100, 100a, 100b, and 100c are manufactured with a simple process. In addition, since the process is simplified, the productivity is improved, and the cost is reduced.

In addition, since the board-shaped carbon 50 has a longitudinal diameter of several micrometers, there is no concern that the conductive network path is reduced during mixing of composite materials for the electrode, and the electric conductivity in the electrode layer of the all-solid battery is effectively exerted. In addition, the board-shaped carbon 50 has a structural characteristic that the board-shaped carbon 50 has a board shape. Thus, when the paste 72 for electrode layer is formed by application, the board-shaped carbon 50 is oriented in nearly parallel to the paste 72 for electrode layer. The board-shaped carbon 50 oriented in the above manner is oriented in a slightly oblique direction as the ceramic is sintered during firing. Thus, the board-shaped carbon 50 plays a role as a conductive auxiliary agent and acts as a collector. As a result, a design that eliminates the need to separately provide a collector layer is enabled.

The component of the paste 72 for electrode layer is preferably adjusted such that the proportion of the board-shaped carbon 50 is 20 vol % or greater in the first electrode layer 10 and the second electrode layer 20. In this case, even when the additive amount of fine-grained carbon to the first electrode layer 10 and the second electrode layer 20 is less than 5 vol %, the first electrode layer 10 and the second electrode layer 20 have sufficient electron conductivity. By reducing the additive amount of fine-grained carbon, inhibition of sintering is suppressed, and high ionic conductivity is maintained in the first electrode layer 10 and the second electrode layer 20. Similarly, it is more preferable to adjust the component of the paste 72 such that the proportion of the board-shaped carbon 50 is 25 vol % or greater in the first electrode layer 10 and the second electrode layer 20. It is further preferable to adjust the component of the paste 72 for electrode layer such that the proportion of the board-shaped carbon 50 is 30 vol % or greater in the first electrode layer 10 and the second electrode layer 20.

For example, it is preferable to adjust the component of the paste 72 for electrode layer such that the proportion of the board-shaped carbon 50 is 50 vol % or less in the first electrode layer 10 and the second electrode layer 20. It is more preferable to adjust the component of the paste 72 for electrode layer such that the proportion of the board-shaped carbon 50 is 45 vol % or less in the first electrode layer 10 and the second electrode layer 20. It is further preferable to adjust the component of the paste 72 for electrode layer such that the proportion of the board-shaped carbon 50 is 40 vol % or less in the first electrode layer 10 and the second electrode layer 20.

In addition, it is preferable to adjust the component of the paste 72 for electrode layer such that the proportion of the amount of the board-shaped carbon 50 to the entire amount of carbon is 80 vol % or greater in the first electrode layer 10 and the second electrode layer 20. It is more preferable to adjust the component of the paste 72 for electrode layer such that the proportion of the amount of the board-shaped carbon 50 to the entire amount of carbon is 85 vol % or greater in the first electrode layer 10 and the second electrode layer 20. It is further preferable to adjust the component of the paste 72 for electrode layer such that the proportion of the amount of the board-shaped carbon 50 to the entire amount of carbon is 90 vol % or greater in the first electrode layer 10 and the second electrode layer 20.

EXAMPLES

An all-solid battery according to the embodiment was fabricated, and the characteristics were examined.

Example 1

$Co_3O_4$, $Li_2CO_3$, ammonium dihydrogenphosphate, $Al_2O_3$, and $GeO_2$ were mixed, and $Li_{1.3}Al_{0.3}Ge_{1.7}(PO_4)_3$ including a predetermined amount of Co as the material powder for solid electrolyte was made by solid phase synthesis. The resulting powder was dry-milled with $ZrO_2$ balls. Then, the dry-milled powder was further wet-milled (disperse medium: ion-exchange water or ethanol) to make solid electrolyte slurry. A binder was added to the obtained slurry. The solid electrolyte paste was obtained to make a green sheet. $Li_{1.3}Al_{0.3}Ti_{1.7}(PO_4)_3$ containing a predetermined amount of $LiCoPO_4$ and a predetermined amount of Co was made by solid-phase synthesis.

The electrode active material and the solid electrolyte material were highly dispersed by wet-bead mill or the like to make ceramic paste made of only ceramic particles. Then, the ceramic paste and board-shaped carbon were mixed to make paste for internal electrode layer. In example 1, board-shaped carbon was added such that the proportion of the board-shaped carbon was 30 vol % in the first electrode layer 10 and the second electrode layer 20 after firing. In example 2, board-shaped carbon was added such that the proportion of the board-shaped carbon was 25 vol % in the first electrode layer 10 and the second electrode layer 20 after firing. In example 3, board-shaped carbon and fine-grained carbon were added such that the proportion of the board-shaped carbon was 25 vol % and the proportion of the fine-grained carbon was 4 vol % in the first electrode layer 10 and the second electrode layer 20 after firing. In example 4, board-shaped carbon was added such that the proportion of the board-shaped carbon was 19 vol % in the first electrode layer 10 and the second electrode layer 20 after firing. In example 5, board-shaped carbon and fine-grained carbon were added such that the proportion of the board-shaped carbon was 19 vol % and the proportion of the fine-grained carbon was 4 vol % in the first electrode layer 10 and the second electrode layer 20 after firing. In example 6, board-shaped carbon was added such that the proportion of the board-shaped carbon was 45 vol % in the first electrode layer 10 and the second electrode layer 20 after firing. In example 7, board-shaped carbon was added such that the proportion of the board-shaped carbon was 50 vol % in the first electrode layer 10 and the second electrode layer 20 after firing. In example 8, board-shaped carbon was added such that the proportion of the board-shaped carbon was 55 vol % in the first electrode layer 10 and the second electrode layer 20 after firing. In example 9, board-shaped carbon and fine-grained carbon were added such that the proportion of the board-shaped carbon was 19 vol % and the proportion of the fine-grained carbon was 6 vol % in the first electrode layer 10 and the second electrode layer 20 after firing. In comparative example 1, fiber carbon was added such that the proportion of the fiber carbon was 20 vol % in the first electrode layer 10 and the second electrode layer 20 after firing. In comparative example 2, fine-grained carbon was added such that the proportion of the fine-grained carbon was 20 vol % in the first electrode layer 10 and the second electrode layer 20 after firing. In examples 1, 2, 4, and 6 to 8, neither fine-grained carbon nor fiber-shaped carbon was added. In examples 3, 5, and 9, no fiber-shaped carbon was added. In comparative example 1, neither board-shaped carbon nor fine-grained carbon was added. In comparative example 2, neither board-shaped carbon nor fiber carbon was added. In examples 1 to 9 and comparative examples 1 and 2, carbon other than board-shaped carbon, fine-grained carbon, and fiber-shaped carbon was not added. These conditions are presented in Table 1. The fiber-shaped carbon is defined as carbon having a diameter of 500 nm or less and a length of 1 am or greater.

TABLE 1

| | Carbon | | | Battery characteristics | | |
|---|---|---|---|---|---|---|
| | Board-shaped | Fine-grained | Fiber-shaped | Electron conductivity | Ionic conductivity | Capacity |
| Example 1 | 30 vol % | | | Very good | Very good | Very good |
| Example 2 | 25 vol % | | | Good | Very good | Very good |
| Example 3 | 25 vol % | 4 vol % | | Very good | Good | Good |
| Example 4 | 19 vol % | | | Slightly good | Very good | Good |
| Example 5 | 19 vol % | 4 vol % | | Slightly good | Good | Good |
| Example 6 | 45 vol % | | | Very good | Very good | Good |
| Example 7 | 50 vol % | | | Very good | Good | Good |
| Example 8 | 55 vol % | | | Very good | Good | Slightly good |
| Example 9 | 19 vol % | 6 vol % | | Slightly good | Slightly good | Slightly good |
| Comparative example 1 | — | | 20 vol % | Rejectable | Slightly good | Rejectable |
| Comparative example 2 | — | 20 vol % | | Slightly good | Rejectable | Rejectable |

Then, the paste for internal electrode layer was printed on the upper face and the lower face of the solid electrolyte layer formed by stacking a plurality of green sheets, and a board cut into a 10 mm square was prepared as a sample. The sample was fired. The firing temperature was 700° C. The oxygen partial pressure during firing was $10^{-13}$ atm or less at 500° C. or greater.

Electron Conductivity

The electron conductivity was examined for examples 1 to 9 and comparative examples 1 and 2. In examples 1, 3, and 6 to 8, the electron conductivity was determined to be very good. In example 2, the electron conductivity was determined to be good. In examples 4, 5, and 9 and comparative example 2, the electron conductivity was determined to be slightly good. In comparative example 1, the electron conductivity was determined to be rejectable. A pellet having a diameter of 10 mm and a thickness of 2 mm was made from mixed powder obtained by drying the electrode paste. The pellet was fired by the same firing process as the all-solid battery to make a sintered compact. Gold electrodes were formed on the upper face and the lower face of the sintered compact by sputtering, and the electric conductivity was measured. The electric conductivity was determined to be very good when the electric conductivity was 100 S/cm or greater, good when $10^{-4}$ S/cm or greater and less than 100 S/cm, slightly good when $10^{-6}$ S/cm or greater and less than $10^{-4}$ S/cm, and rejectable when less than $10^{-6}$ S/cm.

Ionic Conductivity

For examples 1 to 9 and comparative examples 1 and 2, the ionic conductivity was examined. In examples 1, 2, 4, and 6, the ionic conductivity was determined to be very good. In examples 3, 5, 7, and 8, the ionic conductivity was determined to be good. In example 9 and comparative example 1, the ionic conductivity was determined to be slightly good. In comparative example 2, the ionic conductivity was determined to be rejectable. A pellet having a diameter of 10 mm and a thickness of 2 mm was made from mixed powder obtained by drying the electrode paste, and solid electrolyte layers with a thickness of 10 μm were attached to the upper face and the lower face of the pellet. Then, the resulting pellet was fired by the same firing process as the all-solid battery to make a sintered compact. Gold electrodes were formed on the upper face and the lower face of the sintered compact by sputtering, and the electric conductivity was measured. The electric conductivity was determined to be very good when the electric conductivity was $10^{-4}$ S/cm or greater, good when $5\times10^{-5}$ S/cm or greater and less than $10^{-4}$ S/cm, slightly good when $5\times10^{-6}$ S/cm or greater and less than $5\times10^{-5}$ S/cm, rejectable when less than $5\times10^{-6}$ S/cm.

Capacity

Gold electrodes were formed on the upper face and the lower face of the sintered compact sample of each of examples 1 to 9 and comparative examples 1 and 2 by sputtering. Charge and discharge at 0.2 C were performed within a voltage range of 2.7 V to 0 V at 80° C., and then the discharged capacity was measured. The discharged capacity was determined to be very good when the discharged capacity was 40 μAh or greater, good when 20 μAh or greater and less than 40 μAh, slightly good when 10 μAh or greater and less than 20 μAh, and rejectable when less than 10 μAh.

In examples 1 to 9, none of the electron conductivity, the ionic conductivity, and the capacity was determined to be rejectable. For the electron conductivity, it is considered that addition of board-shaped carbon to the electrode layer prevented the reduction of the conductive network (the structure deterioration), which occurs when fine-grained carbon is excessively dispersed, because of the characteristic structure of the board-shaped carbon in the first electrode layer 10 and the second electrode layer 20, and allowed the conductive network to be efficiently formed. For the ionic conductivity, it is considered that addition of board-shaped carbon to the electrode layer inhibited the interaction between the carbon material and the solid electrolyte in the first electrode layer 10 and between the carbon material and the solid electrolyte in the second electrode layer 20.

Compared with examples 4, 5, and 9, the results of the electron conductivity of examples 1 to 3 and 6 to 8 were good. This is considered because the electron conductivity was improved by making the proportion of the board-shaped carbon of the electrode layer 20 vol % or greater. In addition, it is revealed that as the proportion of the board-shaped carbon was increased, the electron conductivity became better.

Compared with example 8, the results of the capacity were good in examples 1 to 7. This is considered because the active material was sufficiently filled by making the proportion of the board-shaped carbon in the electrode layer 50 vol % or less.

Compared with example 9, the results of the ionic conductivity in examples 1 to 8 were good. This is considered because the proportion of the amount of the board-shaped carbon to the entire carbon additive amount was made to be 80 vol % or greater.

Although the embodiments of the present invention have been described in detail, the present invention is not limited to such a specific embodiment, and it is to be understood that the various change, substitutions, and alterations could be made hereto without departing from the spirit and scope of the invention.

What is claimed is:

1. An all-solid battery comprising:
   a solid electrolyte layer mainly composed of oxide-based solid electrolyte;
   a first electrode layer formed on a first principal face of the solid electrolyte layer, the first electrode layer containing an active material;
   a second electrode layer formed on a second principal face of the solid electrolyte layer, the second electrode layer containing another active material, wherein
   no collector layer that is in contact with the second electrode layer is provided in a direction in which the solid electrolyte layer, the first electrode layer, and the second electrode layer are stacked, and
   the second electrode layer includes board-shaped carbon defined as carbon having an average thickness of 3 μm or less and a diameter in a longitudinal direction equal to or greater than three times the average thickness,
   wherein, in the second electrode layer, a proportion of fine-grained carbon defined as carbon made of particles having a primary particle size of 0.5 μm or less is 6 vol % or less, and
   wherein the second electrode layer is a sintered layer and includes a solid electrolyte, and
   wherein a D90 size of the diameter in the longitudinal direction of the board-shaped carbon is 2 μm or more and 30 μm or less.

2. The all-solid battery according to claim 1, wherein in the second electrode layer, a proportion of the board-shaped carbon is 20 vol % or greater.

3. The all-solid battery according to claim 1, wherein in the second electrode layer, a proportion of the board-shaped carbon is 50 vol % or less.

4. The all-solid battery according to claim 1, wherein in the second electrode layer, a proportion of an amount of the board-shaped carbon to an entire amount of carbon is 80 vol % or greater.

5. The all-solid battery according to claim 1, further comprising:
an external electrode coupled to an end of the second electrode layer, wherein
a distance from the external electrode to an end farthest from the external electrode of the second electrode layer is 50 mm or less.

6. The all-solid battery according to claim 1, further comprising:
an external electrode coupled to an end of the second electrode layer, wherein
$L/(W \times t)$ is 2000 or less where t represents an average thickness of the second electrode layer, L represents a collecting distance from the external electrode to an end farthest from the external electrode of the second electrode layer, and W represents an electrode layer width in a direction perpendicular to the collecting distance L in a plane of the second electrode layer.

7. A manufacturing method of an all-solid battery comprising:
preparing a multilayer structure including: a green sheet containing oxide-based solid electrolyte powder, a layer formed on a first principal face of the green sheet by applying paste for a first electrode layer to the first principal face of the green sheet, and a layer formed on a second principal face of the green sheet by applying paste for a second electrode layer to the second principal face of the green sheet, no paste mainly composed of a metal being applied to at least the paste for the second electrode layer; and
firing the multilayer structure, wherein
the paste for the second electrode layer includes board-shaped carbon defined as carbon having an average thickness of 3 μm or less and a diameter in a longitudinal direction equal to or greater than three times the average thickness,
wherein, in the second electrode layer, a proportion of fine-grained carbon defined as carbon made of particles having a primary particle size of 0.5 μm or less is 6 vol % or less,
wherein the paste for the second electrode layer includes a solid electrolyte, and
wherein the second electrode layer is a sintered layer after the firing, and
wherein a D90 size of the diameter in the longitudinal direction of the board-shaped carbon is 2 μm or more and 30 μm or less.

8. The all-solid battery according to claim 1, wherein a proportion of an amount of the board-shaped carbon is 25 vol % or more and 50 vol % or less in the second electrode layer.

9. The all-solid battery according to claim 1, wherein the second electrode layer includes the fine-grained carbon.

10. The method as claimed in claim 7, wherein the paste for the second electrode layer includes the fine-grained carbon after the firing.

* * * * *